United States Patent [19]

Tominaga

[11] 4,036,795

[45] July 19, 1977

[54] AQUEOUS CATIONIC COATING FROM AMINE-EPOXY ADDUCT, POLYAMIDE, AND SEMIBLOCKED POLYISOCYANATE, ACID SALT

[75] Inventor: Akira Tominaga, Hiratsuka, Japan

[73] Assignee: Kansai Paint Co., Ltd., Japan

[21] Appl. No.: 612,281

[22] Filed: Sept. 11, 1975

[30] Foreign Application Priority Data

Sept. 20, 1974   Japan .................... 49-109382

[51] Int. Cl.$^2$ .................... C08J 3/06; C08L 63/02; C25D 13/06
[52] U.S. Cl. .................... 260/18 PN; 204/181; 260/29.2 EP; 260/29.2 TN; 260/47 EC; 260/830 P; 260/835
[58] Field of Search .................... 260/29.2 TN, 29.2 EP, 260/18 PN, 29.2 GP

[56] References Cited

U.S. PATENT DOCUMENTS

| | | | |
|---|---|---|---|
| 2,643,958 | 6/1953 | Kleiner et al. | 260/29.2 TN |
| 2,995,531 | 8/1961 | Hudson | 260/29.2 TN |
| 3,248,259 | 4/1966 | Borsellino et al. | 260/29.2 TN |
| 3,336,253 | 8/1967 | Wong et al. | 260/29.2 EP |
| 3,491,051 | 1/1970 | Elkin et al. | 260/29.2 TN |
| 3,723,372 | 3/1973 | Wakimoto et al. | 260/29.2 TN |
| 3,799,854 | 3/1974 | Jerabek | 260/29.2 TN |
| 3,803,069 | 4/1974 | McWilliams et al. | 260/29.2 TN |
| 3,869,366 | 3/1975 | Suzuki et al. | 204/181 |
| 3,912,566 | 10/1975 | Andrews et al. | 260/830 P |
| 3,922,253 | 11/1975 | Jerabek et al. | 260/77.5 TB |
| 3,947,338 | 3/1976 | Jerabek et al. | 204/181 |

Primary Examiner—John C. Bleutge
Assistant Examiner—A. H. Koeckert
Attorney, Agent, or Firm—Larson, Taylor and Hinds

[57] ABSTRACT

A cationic electrophoretic coating composition comprises an aqueous medium and a resinous binder dispersed therein, said resinous binder being prepared by contacting at least one starting material with a partially blocked polyisocyanate compound at a temperature of 40° to 130° C in the weight ratio of from 5 to 9 of the former to from 5 to 1 of the latter, and subsequently by neutralizing the resulting product with an acid, said starting material being at least one selected from the group consisting of:

1. a mixture of a reaction product prepared by reacting an epoxy resin with a basic amino compound having at least one basic amino group, and a polyamide having at least one basic amino group, in the weight ratio of from 1 to 9 of the reaction product to from 9 to 1 of the polyamide, and
2. a further reaction product prepared by mixing said reaction product with said polyamide at a temperature of 50° to 200° C in the weight ratio of from 1 to 9 of the reaction product to from 9 to 1 of the polyamide, said partially blocked polyisocyanate compound having at least one blocked isocyanate group in the molecule and an average of more than zero to not more than one free isocyanate group per molecule.

10 Claims, No Drawings

AQUEOUS CATIONIC COATING FROM AMINE-EPOXY ADDUCT, POLYAMIDE, AND SEMIBLOCKED POLYISOCYANATE, ACID SALT

This invention relates to cationic electrophoretic coating compositions.

By the term cationic electrophoretic coating composition is meant an aqueous composition which is prepared by neutralizing a resin with an acid to render the resin water-soluble and dissolving or dispersing the resin in water and which is capable of electrophoretically forming a film on an article serving as the cathode for coating operation. Heretofore known as such a cationic electrophoretic coating composition is a composition prepared by mixing a reaction product of a bisphenol A-epichlorohydrin type epoxy resin and a primary or secondary amine with an isocyanate compound having blocked isocyanate groups. When electrophoretically applied, the composition is baked to deblock the isocyanate groups to effect reaction between the epoxy resin and the isocyanate compound, whereby a hardened film is obtained.

The coating film thus produced from the composition, despite its high corrosion resistance afforded by the epoxy resin, has the drawbacks of being inferior in surface smoothness and impact resistance and is therefore unfit for use as a primer for motor vehicles and the like. To eliminate such drawbacks, it is known to modify the epoxy resin with a fatty acid or to modify the blocked isocyanate compound with an polyalkylene polyol. However, such a method still involves the difficulty that the modification leads to lower corrosion resistance.

An object of this invention is to provide cationic electrophoretic coating compositions capable of forming films which are excellent in corrosion resistance, surface smoothness and impact resistance.

Other objects of this invention will become apparent from the following description.

The cationic electrophoretic coating composition of the present invention comprises an aqueous medium and a resinous binder dispersed therein, said resinous binder being prepared by contacting at least one starting material with a partially blocked polyisocyanate compound at a temperature of 40° to 130° C in the weight ratio of from 5 to 9 of the former to from 5 to 1 of the latter, and subsequently by neutralizing the resulting product with an acid, said starting material being at least one selected from the group consisting of:

1. a mixture of a reaction product prepared by reacting an epoxy resin with a basic amino compound having at least one basic amino group, and polyamide having at least one basic amino group, in the weight ratio of from 1 to 9 of the reaction product to from 9 to 1 of the polyamide, and
2. a further reaction product prepared by mixing said reaction product with said polyamide at a temperature of 50° to 200° C in the weight ratio of from 1 to 9 of the reaction product to from 9 to 1 of the polyamide, said partially blocked polyisocyanate compound having at least one blocked isocyanate group in the molecule and an average of more than zero to not more than one free isocyanate group per molecule.

Thus the first-mentioned starting material is a mixture of a reaction product (hereinafter referred to as a "component 1") prepared by reacting an epoxy resin with a basic amino compound having at least one basic amino group, and a polyamide (hereinafter referred to as a "component 2") having at least one basic amino group, the weight ratio of the component 1 to the component 2 being from 1 to 9 of component 1 to from 9 to 1 of component 2. The second-mentioned starting material is prepared by mixing the components 1 and 2 in the same ratio at a temperature of 50° to 200° C to form a further reaction product. According to this invention, the partially blocked polyisocyanate compound (hereinafter referred to as a "component 3") is contacted with at least one of these starting materials at a temperature of 40° to 130° C in the weight ratio of the component 3 to the starting material of from 5 to 1 of components to from 5 to 9 of the starting material, preferably of from 4 to 1.5 of component 3 to from 6 to 8.5 of the starting material. (The resulting product will be hereinafter referred to as a "contact product.") The resinous binder is obtained by neutralizing the contact product with an acid. If the ratio of the component 3 to the starting material is in excess of 5:5, the coating film obtained will be inferior in mechanical properties such as flexibility, adhesion and impact resistance. Conversely, when the ratio is smaller than 1:9, the coating film formed will have poor corrosion resistance.

The starting material is prepared from the component 1 and component 2 in the weight ratio of from 1 to 9 of component 1 to from 9 to 1 of component 2, with or without heating at 50° to 200° C. If the ratio of component 1 reltive to component 2 is less than 1:9, the coating film obtained has poor properties, especially in respect of corrosion resistance, whereas if it is more than 9:1, the resulting coating film is poor in such properties as impact resistance, flexibility, adhesion and smoothness. Particularly preferable weight ratio of the former and the latter is from 3 to 7 to from 7 to 3.

The component 1 to be used in this invention is a reaction product obtained by reacting an epoxy resin with a basic amino compound. The reaction product of epoxy resin and basic amino compound is not particularly limited as to the reaction conditions under which it is prepared, insofar as it is obtained by the reaction therebetween. Usable as the epoxy resin are those obtained from phenolic compound and epichlorohydrin, acid epoxy resin containing at least two epoxy groups per molecule and usually having a molecular weight of about 200 to 4,000, preferably about 400 to 2,000. More specific examples of phenol type resins are an epoxy resin prepred from bisphenol A and epichlorohydrin, an epoxy resin prepared from hydrogenated bisphenol A and epichlorohydrin, an epoxy resin prepared from bisphenol A and β-methylepichlorohydrin, a polyglycidyl ether of novolak resin etc., among which especially preferable is the epoxy resin obtained from bisphenol A and epichlorohydrin. With this invention such a phenol type epoxy resin is usable conjointly with polyepoxide compounds such as polyglycidyl ethers of ethylene glycol, propylene glycol, glycerin, trimethylolpropane or like polyhydric alcohol, polyglycidyl esters of adipic acid, phthalic acid, dimer acid or like polycarboxylic acid, polyepoxides obtained by epoxidizing alicyclic olefin or 1,2-polybutadiene, etc. The polyepoxide compounds can be employed in an amount of up to about 25% by weight in order to plasticize the phenol type epoxy resin. Use of more than 25% by weight of the polyepoxide compounds will impair corrosion resistance of phenol type epoxy resins.

Exemplary of the basic amino compounds to be reacted with the epoxy resin are aliphatic or alicyclic amino compounds having a primary and/or secondary amino group. Preferable examples are monoamines such as mono- or dialkylamine, mono- or di-alkanol amines and polyamines such as polyalkylene polyamines, etc. Useful monoamines are mono- or di-alkylamines having about 1 to 18 carbon atoms, such as propylamine, butylamine, diethylamine, dipropylamine, etc. Examples of mono- or di-alkanol monoamines are ethanolamine, propanolamine, diethanolamine, dipropanolamine, etc. Useful examples of other monoamines are piperidine, cyclohexylamine, pyrrolidine, morpholine, etc. Examples of polyamines are ethylenediamine, hexamethylenediamine, diethylenetriamine, triethylenetetramine, tetraethylenepentamine, propylenediamine, dipropylenetriamine, butylenediamine, N-aminoethanolamine, monoethylethylenediamine, diethylaminopropylamine, hydroxyethylaminopropylamine, monomethylaminopropylamine, piperazine, N-methylpiperazine, N-aminoethylpiperazine, etc. Particularly preferable are aliphatic mono- or polyamines having one secondary amino group, such as diethylamine, diethanolamine, diethylenetriamine mono-ethylethylenediamine, hydroxyethylaminopropylamine, etc. in respect of the reactivity with epoxy resin. According to this invention, an aromatic amine can be used in combination with the aliphatic or alicyclic amine in such amount that the reaction product of epoxy resin and basic amine, when neutralized with acid, will still remain dispersible in water. Examples of useful aromatic amines are aniline, N-methylaniline, toluidine, benzylamine, m-xylylenediamine, m-phenylenediamine, 4,4'-diaminodiphenylmethane, etc. Use of such aromatic amine achieves the effect of increasing resistances to water and to corrosion of the coating film.

The reaction of epoxy resin with the basic amino compound, which is exothermic, is effected simply when the reactants are mixed together at room temperature. To complete the reaction promptly, however, it is preferable to heat the reaction system at a temperature of 50° to 150° C, advantageously at about 70° to 130° C. The basic amino compound to be reacted with the epoxy resin may be used at least in such amount that the resulting product can be rendered soluble in water when neutralized with an acid. However, when a primary monoamine only is used as the basic amino compound, at least ½ mole of the amine is preferably used per equivalent of the epoxy group in order to prevent gelation. Further when a polyamine only is used, it is desirable to use at least ⅓ mole of the amine per equivalent of the epoxy group to avoid gelation. It is often preferably in such a case to effect the reaction by adding an epoxy resin dropwise to an amine and to thereafter remove the unreacted amine by vacuum distillation or extraction. It is preferable to use solvents in which the epoxy resin and amino compound are soluble and which are miscible with water. Examples thereof are isopropanol, sec-butanol, tert-butanol, ethylene glycol monoethyl ether and like alcohols, butyl acetate, ethylene glycol monoethyl ether acetate and like esters, methyl ethyl ketone, diacetone alcohol, diacetone alcohol methyl ether and like ketones. When the solvent is used, the amount thereof is usually up to about 60% by weight, preferably 10 to 40% by weight, based on the total amount of the epoxy resin and the amino compound.

Examples of the polyamide resin having a basic amino group to be mixed or allowed to react with component 1 are those containing in the molecule at least one amino group and at least one amido group which can react with the isocyanate group of partially blocked polyisocyanate compound. More specific examples are polyamides prepared by condensation of dicarboxylic acid and polyamine, by reacting a polyamine with an oligomer prepared by the ring-opening polymerization of lactam such as ε-caprolactam, a polyesterpolyamide of alkanolamine and dicarboxylic acids, etc. The dicarboxylic acid are those represented by general formula

HOOC—R—COOH wherein R is a saturated or unsaturated aliphatic hydrocarbon group or aromatic hydrocarbon group having 1 to 34 carbon atoms. Preferable examples are phthalic acid, malonic acid, maleic acid, fumaric acid, succinic acid, azelaic acid, adipic acid, sebacic acid, dodecylsuccinic acid, dimer acid, etc. The polyamines are polyalkylene polyamines having primary amino group at both ends of main chain, represented by general formulas

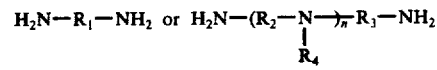

$$H_2N-R_1-NH_2 \text{ or } H_2N-(R_2-\underset{R_4}{N})_n R_3-NH_2$$

wherein $R_1$, $R_2$ and $R_3$ are aliphatic hydrocarbon group having 2 to 6 carbon atoms respectively, $R_4$ is hydrogen or an aliphatic hydrocarbon group having 1 to 3 carbon atoms and n is an integer of 1 to 6. Preferable examples are ethylenediamine, propylenediamine, butylenediamine, hexamethylenediamine, tetraethylenepentamine, pentaethylenehexamine, hexamethyleneheptamine, hexaethyleneoctamine, diethylenetriamine, triethylenetetramine, bis(3-aminopropyl)-amine, 1,3-bis(3'-aminopropylamino)propane, etc. Useful alkanolamines include those having 2 to 6 carbon atoms such as ethanolamine, propanolamine, hydroxyethylaminopropylamine, etc.

The polyamide is mixed with the component 1 at room temperature or at an elevated temperature to produce the mixture of the polyamide and the component 1. When the polyamide and the component 1 are mixed together with heating, they are heated at 50° to 200° C, more advantageously at 80° to 150° C for about 30 minutes to 2 hours. In such a case, the remaining epoxy groups in component 1 may preferably be in such amount that the resulting further reaction product does not become highly viscous or does not undergo gelation, namely, a number of epoxy groups of not more than 1 per one molecule of epoxy resin. When the mixing is conducted with heating, it is preferable to use a solvent such as ethylene glycol monoethyl ether acetate or diacetone alcohol methyl ether which will not react with isocyanate groups.

In the present invention, it is critical that the starting material thus obtained be contacted with the component 3, namely a partially blocked polyisocyanate compound. The partially blocked polyisocyanate compound to be used is a polyisocyanate compound having at least one blocked isocyanate group in the molecule and an average of more than zero to not more than one free isocyanate group per molecule. If the compound contains less than one blocked isocyanate group in the molecule, the resulting electrophoretic coating composition tends to exhibit lower curability when baked, whilst if the average number of free isocyanate groups per molecule is in excess of one, objectionable gelation is liable to take place in the course of contact between the partially blocked polyisocyanate compound and the reaction product of epoxy resin and basic amino compound, or polyamide resin having basic amino groups.

The partially blocked polyisocyanate compound can be readily prepared by reacting a polyisocyanate compound having at least two isocyanate groups in the molecule with a blocking agent in an amount sufficient to permit the resulting product to contain more than zero to not more than one free isocyanate group per molecule on average. Because this reaction is highly exothermic, it is desirable to add the blocking agent dropwise to the polyisocyanate compound. Preferably the reaction is carried out at a low temperature of about 20° to 80° C. Examples of useful polyisocyanate compounds are those containing at least two isocyanate groups in the molecule, such as m- or p-phenylenedlisocyanate, 4,4'-diphenylmethanediisocyanate, 2,4- or 2,6-tolylenediisocyanate, m- or p-xylylenediisocyanate and like aromatic diisocyanate compounds; hexamethylenediisocyanate, dimer acid diisocyanate, isophoronediisocyanate and like aliphatic or alicyclic diisocyanate compounds; adducts of such aromatic or aliphatic diisocyanate compounds and ethylene glycol, propylene glycol, glycerin, trimethylolpropane, pentaerythritol and like polyols; trimers of such aromatic or aliphatic diisocyanates; etc. Preferable among these examples are aromatic polyisocyanates such as tolylenediisocyanate, xylylenediisocyanate, and adducts of tolylenediisocyanate or xylylenediisocyanate and polyol.

The blocking agents to be used are volatile low-molecular-weight active hydrogen compounds such as methanol, ethanol, propanol, butanol, hexanol, cyclohexanol, benzyl alcohol, ethylene glycol monoethyl ether, ethylene glycol monobutyl ether and like aliphatic, alicyclic or aromatic monoalcohols, dimethyl- or diethyl-amino ethanol and like hydroxy tertiary amines, acetoxime, methyl ethyl ketone oxime and like oximes, acetylacetone, acetoacetate, malonate and like active methylene compound, phenol, ε-caprolactam, etc. Preferable among these examples are aliphatic or aromatic monoalcohols.

The contact of the partially blocked polyisocyanate compound with the starting material mentioned before is conducted usually at a temperature of about 40° to 130° C, preferably of about 60° to 110° C for 30 minutes to 2 hours to prevent deblocking of the blocked isocyanate group. In order to enable the starting material to retain amino groups in an amount sufficient for solubilization with an acid and also to prevent gelation on contact with the partially blocked polyisocyanate compound, it is preferable, before the above reaction, to react the starting material with a ketone such as acetone, methyl ethyl ketone, diethyl ketone, methyl isobutyl ketone or the like to thereby convert the amino groups to ketimine. The ketimine forming reaction can be effected readily by heating the reactants at a temperature of at least 100° C and distilling off the resulting water. When the product resulting from the ketimine forming reaction is subsequently neutralized with an acid, the ketimine groups are hydrolyzed to amino groups. The ketimine-containing product can be neutralized in the same manner as when the amino-containing product is directly neutralized.

The amine value of the resulting contact product is generally about 25 to 400, preferably 50 to 200. If the amine value is not within the above range, the coating composition has poor water-dispersibility or poor throwing power and the coating film obtained therefrom exhibits inferior corrosion resistance.

For the contact of the partially blocked polyisocyanate compound with the starting material, solvents inert to the isocyanate group are usable to prevent gelation. Examples of solvents are ethylene glycol monoethyl ether acetate, butyl acetate, diethylene glycol dimethyl ether, methyl isobutyl ketone, diacetone alcohol methyl ether, etc.

The resinous binder is then neutralized with an acid and is thereby rendered soluble or dispersible in water. The acid to be used for neutralization is formic acid, acetic acid, propionic acid, butyric acid, hydroxyacetic acid, lactic acid or like water-soluble organic acid, or hydrochloric acid, phosphoric acid or like water-soluble inorganic acid. The acid is used in such amount that it is at least sufficient to render the binder soluble or dispersible in an aqueous medium and is not more than the equivalent of the amino groups contained in the binder. The binder neutralized with the acid is then dissolved or dispersed in an aqueous medium to a concentration of 3 to 30% by weight, preferably to about 5 to 15% by weight.

The aqueous medium to be used in this invention is water or a mixture of water and an organic solvent. Useful organic solvents are a wide variety of those miscible with water such for example as iso-propanol, sec-butanol, ethylene glycol monoethyl ether and like alcohols, butyl acetate, ethylene glycol monoethyl ether acetate and like esters, methyl ethyl ketone, diacetone alcohol and like ketones.

The solvent is used, usually in an amount of up to 50% by weight based on water.

The aqueous solution or dispersion of the electrophoretic coating composition of this invention may contain a pigment, surfactant, curing catalyst and the like as desired. Useful pigments include coloring pigments and extender pigments. Examples of coloring pigments are various usual coloring pigments such as red iron oxide, titanium dioxide, carbon black, etc. Exaples of extender pigments are clay, mica, talc, calcium carbonate and like usual extender pigments. The surfactant can be used, although it is not always necessary since the composition is fully soluble or dispersible in water without the surfactant. Usable are for example nonionic surfactants such as polyoxyethylene glycol or polyoxypropylene glycol and their derivatives. Further usable as the curing catalyst are a wide variety of usual curing catalysts such, for example, as acetate, naphthenate, oleate, chromate, phosphate and like salts of bismuth, lead, tin, iron, cobalt, nickel, aluminum, zinc, manganese, copper, zirconium and like metals.

The present composition may also contain a neutral or cationic water-soluble resin which is compatible therewith. Exemplary of neutral resins are water-soluble phenol resin, water-soluble melamine resin, polyacrylamide, methylolated polyacrylamide, polyvinyl alcohol, polyvinylpyrrolidone, and polyvinyl methyl ether. Examples of cationic resin are copolymers comprising dialkylaminoethyl methacrylate or dialkylaminopropyl methacrylate, and addition products of glycidyl methacrylate copolymers and secondary amines.

The aqueous solution or dispersion of the present coating composition can be electrophoretically applied with satisfactory results by employing usual electrophoretic coating apparatus. The article to be coated serves as the cathode and an ordinary carbon plate as the anode. The electrophoretic coating operation may be conducted under usual conditions. For example, the coated article is then baked for curing usually at a temperature of 150° to 250° C, preferably of 180° to 220° C for 15 to 45 minutes. When the coating is baked, the blocked isocyanate groups in the resin release the blocking agent and undergo cross-linking reaction with the amino, amido, hydroxyl and like groups in the resin to effect curing.

The electrophoretic coating composition of this invention is suitable for coating usual steel sheets treated with zinc phosphate and iron phosphate as well as untreated steel sheets which are prone to corrosion. The coated sheets obtained, although free from a hexavalent chromium compound, exhibit high corrosion resistance. The present composition is also suitable for coating zinc-plated and tin-plated steel sheets, and aluminum, copper and copper alloy substrates.

This invention will be described below in greater detail with reference to examples, in which parts and percentages are all by weight. The amine values in the examples are determined by the following method.

Determination of amine value:

A 0.2 to 0.3 g quantity of specimen is placed into a 100-ml Erlenmeyer flask and melted by heating. After cooling, the specimen is titrated with 1/10N aqueous HCl solution using Bromophenol Blue as an indicator. The amount of the titrant is measured when the color has changed from blue to yellow to calculate the amine value from the following equation:

$$\text{Amine value} = \frac{\text{Amount of 1/10N HCl soln. (ml)} \times \text{Factor of 1/10N HCl soln.}}{\text{Amount of specimen (g)} \times \text{Solid content (\%)} \times \frac{1}{100}} \times 5.61$$

EXAMPLE 1

A 400-part quantity of epoxy resin of the bisphenol A type (trade mark: "Epikote 828," product of Shell Chemical Co., Ltd., Japan), 190 in epoxy equivalent, is dissolved in 100 parts of ethylene glycol monoethyl ether acetate, and 110 parts of diethylamine is added dropwise to the solution at 40° to 60° C. After heat generation has ceased, the mixture is maintained at an elevated temperature of 110° C for 1 hour to obtain an epoxy resin-amine reaction product having an amine value of 160.

A 400-part quantity of polyamide resin of the dimer acid type having an amine value of 100 and a softening point of 40° C (trade mark: "Tohmide 210," product of Fuji Kasei Co., Ltd., Japan) is dissolved in 200 parts of methyl isobutyl ketone, and the solution is refluxed with heating at 130° to 150° C while distilling off the resulting water to convert the terminal amino groups to ketimine. Removal of the water is terminated when the reaction system has been maintained at 150° C for about 3 hours. The reaction mixture is cooled to 60° C, and the epoxy resin-amine reaction product is then added thereto.

To 174 parts of tolylenediisocyanate (a mixture of 80%, 2,4-tolylenediisocyanate and 20% 2,6-tolylenediisocyanate, the same as hereinafter) is added dropwise 81.4 parts of n-butanol at a temperature of up to 50° C over a period of 2 hours. The mixture is maintained at 60° C for 1 hour to prepare a partially blocked diisocyanate having a mole ratio of 1:1.1 (tolylenediisocyanate: n-butanol).

The partially blocked diisocyanate (153 parts) is added to the mixture obtained above, and the resulting mixture is maintained at about 80° C for 2 hours to prepare a composition containing 76.4% of solids and having an amine value of 99.

To a portion of the resin composition (131 parts) are added 6.4 parts of acetic acid and 862.6 parts of deionized water to obtain a uniform aqueous dispersion containing about 10% of nonvolatiles and having a pH of 5.5. Using the dispersion as an electrophoretic coating bath, a steel sheet treated with zinc phosphate as the cathode and a carbon plate as the anode, the steel sheet is electrophoretically coated at 25° C and 200V for 2 minutes. The steel sheet is thereafter withdrawn from the bath and baked at 180° C for 30 minutes to obtain a 20-micron thick cured film having a pencil hardness of 2H. The film has the following properties:

| | |
|---|---|
| Impact resistance (½ in., 1 kg, 50 cm) | No change |
| Corrosion resistance (240 hrs.) | No change |
| Surface smoothness | Excellent |

These properties are measured by the following method:

IMPACT RESISTANCE:

After leaving the coated plate to stand in a constant temperature and constant humidity chamber at a temperature of 20 ± 1° C and a humidity of 75% for 1 hour, the following test is conducted in the same chamber. A bearer and a center of impact of sizes (½ inch in diameter) are fitted to a Du Pont impact tester and the plate is put between them, turning the coated surface of the plate upward. The weight (1 kg) is dropped on the center of impact from the prescribed height and the plate is taken out, and after having been left for an hour in the room, the damage of surface is observed.

CORROSION RESISTANCE:

Diagonal cut lines are formed in the film on the test plate to such an extent as to reach the base plate. The test plate is then subjected to brine spray test using 5% aqueous solution of common salt at a temperature of 35° C and a humidity of 100%.

SURFACE SMOOTHNESS:

Determined with the naked eye.

EXAMPLE 2

A 500-part quantity of epoxy resin of the bisphenol type (trade mark: "Epikote 1001," product of Shell Chemical Co., Ltd., Japan), 500 in epoxy equivalent, is dissolved in 200 parts of diacetone alcohol methyl ether and 50.5 parts of diisopropylamine and 21.5 parts of diethanolamine are added dropwise to the solution at 60° to 80° C. The mixture is maintained at an elevated temperature of 100° C for 1 hour to obtain an epoxy resin-amine reaction product having an amine value of 68.

A 400-part quantity of liquid polyamide resin having an amine value of 300 (trade mark: "Versamid 125," product of Daiichi General Co., Ltd., Japan) is added to the reaction product, and the mixture is heated to 100°

C, thereafter maintained at the same temperature for 1 hour and cooled to 80° C. To the reaction mixture is added dropwise 398 parts of a partially blocked diisocyanate (mole ratio: 1:1) prepared from 253 parts of tolylene-diisocyanate and 145 parts of ethylene glycol monoethyl ether in the same manner as in Example 1. After maintaining the resulting mixture at 100° C for 2 hours, 125 parts of ethylene glycol monoethyl ether is added thereto to obtain a composition containing about 80% of solids. To the composition (125 parts) are added 6.0 parts of propionic acid and 144 parts of deionized water to prepare an aqueous dispersion containing 40% of solids. To the aqueous dispersion (62.5 parts) are added 12.5 parts of red iron oxide, 12.5 parts of titanium dioxide, 5 parts of talc, 1 part of tin acetate and 20 parts of water, and the mixture is kneaded in a ball mill for 20 hours. To the resulting mixture are further added 187.5 parts of the 40% aqueous dispersion and 700 parts of deionized water to prepare an electrophoretic bath containing about 13% of solids and having a pH of 6.5. Using a steel sheet treated with iron phosphate as the cathode and a carbon plate as the anode, the steel sheet is electrophoretically coated in the bath at 30° C and 220 V for 3 minutes. The steel sheet is thereafter baked at 190° C for 20 minutes to obtain a 24-micron thick cured film having a pencil hardness of 4H. The bath has a throwing power (determined by pipe method) of 15.5 cm at the same voltage.

The film has the following properties:

| | |
|---|---|
| Impact resistance (¼ in., 1 kg, 50 cm) | No change |
| Corrosion resistance (240 hrs.) | No change |
| Surface smoothness | Excellent |
| Erichsen value | 7 mm or higher |

Impact resistance, corrosion resistance and surface smoothness are measured in the same manner as in Example 1 respectively. Erichsen value is determined by the following method:

ERICHSEN VALUE:

The coated plate is placed in a constant temperature and humidity chamber kept at 20° C and a humidity of 75% for one hour. Thereafter, the plate is set an Erichsen testing machine.

A punch having a radius of 10 mm is pushed outward predetermined distance in contact with the rear face of the plate at as uniform a speed as possible of about 0.1 mm/sec. The pushed out portion of the plate is checked by the naked eye for cracking or peeling immediately after pushing out to determined the maximum distance (mm) of stroke of the punch causing no changes on the coating.

EXAMPLE 3

A 425-part quantity of epoxy resin of the bisphenol A type (trade mark: "Epikote 1004," product of Shell Chemical, Co., Ltd., Japan), 950 in epoxy equivalent and 130 parts of alicyclic epoxy resin, 130 in epoxy equivalent (trade mark: "Chissonox 221," product of Chisso Co., Ltd., Japan), are dissolved in 220 parts of ethylene glycol monoethyl ether acetate, 91 parts of diethylamine is added dropwise to the solution at 80° to 100° C and the resulting mixture is maintained at 120° C for 2 hours to obtain an epoxy resin-amine reaction product having an amine value of 108. To the reaction product is added 245 parts of polyamide resin having an amine value of 350 (trade mark: "Versamid 140," product of Daiichi General Co., Ltd., Japan), followed by mixing. The mixture is thereafter cooled to 60° C. From 168 parts of hexamethylenediisocyanate and 120 parts of ethylene glycol monoethyl ether, a partially blocked diisocyanate (1:1.5 in mole ratio) is prepared in the same manner as in Example 1. To the above cooled mixture is added a solution of the partially blocked diisocyanate (258 parts) in 130 parts of ethylene glycol monoethyl ether acetate. The mixture is heated to 100° C and maintained at the same temperature for 1 hour to obtain a composition containing about 77% of solids and having an amine value of 86. To the composition (130 parts) are added 6.5 parts of acetic acid and 113.5 parts of deionized water to prepare an aqueous dispersion containing 40% of nonvolatiles. The same procedure as in Example 2 is thereafter followed to prepare a pigment-dispersed composition containing 13% of nonvolatiles and having a pH of 5.0. The electrophoretic coating bath thus formulated has a throwing power of 17.5 cm at 250 V for 2 minutes. A zinc phosphate-treated steel sheet is electrophoretically coated in the bath at 30° C and 250 V for 3 minutes. The coated sheet is baked at 180° C for 40 minutes to obtain a 21-micron thick film having a pencil hardness of 3H. The film has the following properties:

| | |
|---|---|
| Impact resistance (¼ in., 1 kg, 50 cm) | No change |
| Corrosion resistance (480 hrs.) | No change |
| Surface Smoothness | Excellent |

The above properties are determined in the same manner as in Example 1.

EXAMPLE 4

A 1,275-part quantity of epoxy resin of the bisphenol A type (trade mark: "Epikote 1004," product of Shell Chemical Co., Ltd., Japan), 950 in epoxy equivalent is dissolved in 400 parts of ethylene glycol monoethyl ether, and the solution is added dropwise to 90 parts of ethylenediamine in 100 parts of ethylene glycol monoethyl ether at 60° C. The mixture is maintained at 80° C for 2 hours, and the solvent and unreacted amine are removed under a reduced pressure to obtain an epoxy resin-amine reaction product having an amine value of 180. Subsequently 292 parts of adipic acid, 174 parts of hexamethylenediamine, 154.5 parts of diethylenetriamine and 600 parts of water are placed into an autoclave to prepare a solution, which is then maintained at 220° C for 3 hours under an increased pressure for 3 hours and thereafter cooled. A viscous liquid is separated from the reaction mixture to give a polyamide resin having an amine value of 260. The resin (400 parts) is added to the epoxy resin-amine reaction product, and the mixture is refluxed with heating along with 600 parts of methyl ethyl ketone for reaction until disappearance of distilled water to thereby convert the terminal amino groups to ketimine. A 272 parts (solids) of 75% ethyl acetate solution of polyisocyanate (trade mark: "Desmodur L," product of Bayer A. G. West Germany) obtained from 1 mole of trimethylolpropane and 3 moles of tolylenediisocyanate is added dropwise to 60 parts of ethylene glycol monoethyl ether at a temperature of up to 50° C, and the mixture is maintained at 70° C for 2 hours to give 332 parts (solids) of partially blocked polyisocyanate. The product is added dropwise to the resin solution at 80° to 100° C, and the mixture is maintained at 100° C for 2 hours and then cooled to obtain a resin composition containing about 63% of solids and having an amine value of 116. To the composition (160 parts) are added 6.5 parts of lactic acid and 112.5 parts of deionized water to prepare an aqueous dispersion containing 40% of solids. Following the same procedure as in Example 2, the dispersion is formulated into a pigment-dispersed composition containing 13% of nonvolatiles and having a pH of 6.5. The composition is used as an electrophoretic coating bath to coat a degreased steel sheet at 280 V for 3 minutes. The coated sheet is baked at 200° C for 15 minutes to obtain a 18-micron thick film having a pencil hardness of 3H.

The film has the following properties:

| | |
|---|---|
| Impact resistance (½ in., 1 kg, 50 cm) | No change |
| Corrosion resistance (240 hrs.) | No change |
| Surface smoothness | Excellent |
| Erichsen value | 7 mm or higher |

The above properties are determined in the same manner as in Example 2.

EXAMPLES 5 to 12

The starting materials listed in Table 1 below are used to prepare reaction products in the same manner as in Example 1. The reaction products are formulated into aqueous dispersions, which are used as coating baths for electrophoretic coating operation. Properties of the films obtained are almost equal to those of the films obtained in Example 1.

of methyl isobutyl ketone, and 73 parts of diethylamine is added dropwise to the solution at 80° to 100° C. The mixture is heated at 120° C and maintained at the same temperature for 1 hour. Subsequently 174 parts of tolylenediisocyanate is added dropwise to 180 parts of ethylene glycol monoethyl ether at 60° to 80° C, the mixture is heated at 120° C and maintained at the same temperature for 1 hour. The reaction mixture is mixed with the epoxy resin-amine reaction product obtained above to prepare a resin composition containing about 74% of solids. To the composition (135 parts) are added 5 parts of acetic acid and 860 parts of deionized water to formulate an aqueous dispersion containing 10% of solids and having a pH of 4.0. The dispersion is found to contain some water-insolubles suspended therein. The dispersion is used as a coating bath to electrophoretically coat a degreased steel sheet at 25° C and 190 V for 2 minutes. The coated sheet is baked at 180° C for 30 minutes to obtain a 1.2-micron thick hard film having a pencil hardness of 5H. The film is poor in smoothness and has defects such as pinholing and cissing. The film becomes swollen with acetone and cracks when a prescribed weight (½ in. and 1 kg) is dropped thereagainst from 20 cm thereabove. However, when subjected to corrosion resistance test, the film remains free of any change for 240 hours.

The pencil hardness is determined by the following method, and the other properties are determined in the same manner as in Example 2.

Table 1

| Example No. | Component 1 | | Component 2 | Component 3 | |
|---|---|---|---|---|---|
| | Epoxy resin | Amino compound | Polyamide | Polyisocyanate compound | Blocking agent |
| 5 | Epikote 828 | Ethanolamine*¹ | Tohmide*² No.245 | Tolylenediisocyanate | n-Butanol |
| 6 | Epikote 834 | Diethylene triamine | Tohmide No.215 | m-Xylylenediisocyanate | Hexanol |
| 7 | Epikote 1001 | Diethyl ethylenediamine | Tohmide No.225-X | Dimer acid diisocyanate | Ethylene glycol monobutyl ether |
| 8 | Epikote 1004 | N-Methyl-piperazine | Versamid*³ 100 | Tolylenediisocyanate-ethylene glycol addition product | Ethylene glycol monoethyl ether |
| 9 | Epikote 871 | Diethylamine : 8 m-Xylylenediamine : 2 (molar ratio) | Versamid 115 | Tolylenediisocyanate-trimethylol propane addition product | iso-Propanol |
| 10 | Epikote 871 | Ethylenediamine | Tohmide no.210 | Tolylenediisocyanate | Ethylene glycol monoethyl ether |
| 11 | Epikote 1001 | Propylamine : 7 4,4'-Diaminodiphenyl methane : 3 (molar ratio) | Phthalic acid : 1 Dimer acid : 1 Adipic acid : 1 Monoethanolamine : 4 (molar ratio) | tolylenediisocyanate | Ethylene glycol monoethyl ether |
| 12 | Epikote 1004 | Diethanolamine : 9 m-Phenylenediamine : 1 (molar ratio) | Phthalic acid : 1.5 Adipic acid : 1.5 Ethylenediamine : 2 Diethylenetriamine : 2 (molar ratio) | Dimer Acid diisocyanate | Ethylene glycol monoethyl ether |

Note:
*¹Trade mark: product of Shell Chemical Co., Ltd., Japan.
*²Trade mark: Fuji Kasei Co., Ltd., Japan.
*³Trade Mark: Daiichi General Co., Ltd., Japan.

COMPARISON EXAMPLE 1

A 500-part quantity of epoxy resin (trade mark: "Epikote 1001," product of Shell Chemical Co., Ltd., Japan), 500 in epoxy equivalent, is dissolved in 300 parts

PENCIL HARDNESS:

Leave a test panel to stand in a constant temperature and constant humidity chamber at a temperature of 20

± 1° C and a humidity of 75% for 1 hour. Fully sharpen a pencil (trade mark "UNI," product of Mitsubishi Pencil Co., Ltd., Japan) by a pencil sharpner and then wear away the sharp pencil point to flatness. Firmly press the pencil against the coating surface of the test panel at an angle of 45° between the axis of the pencil and the coating surface and push the pencil forward at a constant speed of 3 cm/sec. as positioned in this state. Repeat the same procedure 5 times with each of pencils having various hardness. The hardness of the coating is expressed in term of highest of the hardness of the pencils with which the coating remains unbroken at more than 4 strokes.

COMPARISON EXAMPLE 2

A 500-part quantity of epoxy resin of the bisphenol A type ("Epikote 1001"), 500 in epoxy equivalent, is dissolved in 200 parts of toluene, and 73 parts of diethylamine is added dropwise to the solution at 80° to 100° C. The mixture is then heated at 120° C and maintained at the same temperature for 1 hour. To the reaction mixture is further added 280 parts of dehydrated castor oil fatty acid, and the resulting mixture is heated at 110° C first and then progressively to 200° C while removing excess toluol. The mixture is refluxed at the same temperature for 5 hours to effect reaction until the acid value thereof reduces to 5 or lower while distilling off the resulting water. After the completion of the reaction, the reaction mixture is distilled at a reduced pressure, 300 parts of butyl acetate is added to the residue and the mixture is cooled to 100° C. To the cooled mixture is added 248 parts of a reaction product of tolylenediisocyanate and n-butanol (in 1:1 mole ratio) separately prepared, and the mixture is heated to 120° C and maintained at the same temperature for 2 hours to give a resin composition containing about 79% of solids. To the composition (127 parts) are added 5.6 parts of acetic acid and 127 parts of deionized water to prepare an aqueous dispersion containing 40% of solids. The dispersion is very turbid in white. In the same manner as in Example 2, the dispersion is formulated into a pigment-dispersed composition containing 13% of nonvolatiles and having a pH of 3.8. The composition is used as a coating bath to electrophoretically coat a degreased steel sheet at 30° C and 130 V for 3 minutes. The coated sheet is then baked at 180° C for 30 minutes to obtain a 28-micron thick film having a pencil hardness of H. At 130 V for 3 minutes, the bath has a throwing power of 8.0 cm. When tested for impact resistance with a prescribed weight (½ in., 1 kg) at 50 cm, the film remains unchanged, whereas salt spray test produces marked blistering at the cross-cut portions of the film in 72 hours.

These properties are determined in the same manner as in Comparison Example 1.

What we claim is:

1. A cationic electroporetic coating composition comprising an aqueous medium and a resinous binder dispersed therein, said resinous binder being prepared by contacting at least one starting material with a partially blocked polyisocyanate compound at a temperature of 40° to 130° C in the weight ratio of from 5 to 9 of the former to from 5 to 1 of the latter, and subsequently by neutralizing the resulting product with an acid, said starting material being at least one selected from the group consisting of:
    1. a mixture of a reaction product prepared by reacting an epoxy resin with a basic amino compound having at least one basic amino group, and a polyamide having at least one basic amino group, in the weight ratio of from 1 to 9 of the reaction product to from 9 to 1 of the polyamide, and
    2. a further reaction product prepared by mixing said reaction product with said polyamide at a temperature of 50° to 200° C in the weight ratio of from 1 to 9 of the reaction product to from 9 to 1 of the polyamide, said partially blocked polyisocyanate compound having at least one blocked isocyanate group in the molecule and an average of more than zero to not more than one free isocyanate group per molecule.

2. The cationic electrophoretic coating composition according to claim 1, in which said contacting is conducted at a temperature of 60° to 110° C.

3. The cationic electrophoretic coating composition according to claim 1, in which said contacting is conducted in the weight ratio of said starting material to said partially blocked polyisocyanate compound of from 6 to 8.5 of the former to from 4 to 1.5 of the latter.

4. The cationic electrophoretic coating composition according to claim 1, in which said weight ratio of said reaction product relative to said polyamide is from 3 to 7 of the former to from 7 to 3 of the latter.

5. The cationic electrophoretic coating composition according to claim 1, in which said mixing of said reaction product with said polyamide is conducted at a temperature of 80° to 150° C.

6. The cationic electrophoretic coating composition according to claim 1, in which said epoxy resin is one obtained from phenolic compound and epichlorohydrin.

7. The cationic electrophoretic coating composition according to claim 1, in which said basic amino compound is an aliphatic mono- or polyamine having one secondary amino group.

8. The cationic electrophoretic coating composition according to claim 1, in which said polyamide is a product prepared by condensation of dicarboxylic acid and a polyamine, a product by reacting a polyamine with an oligomer prepared by the ring-opening polymerization of a lactam, or a polyester-polyamide of an alkanolamine and dicarboxylic acid.

9. The cationic electrophoretic coating composition according to claim 1, in which said partially blocked polyisocyanate compound is an aromatic polyisocyanate having at least one blocked isocyanate group in the molecule and an average of more than zero to not more than one free isocyanate group per molecule.

10. The cationic electrophoretic coating composition according to claim 1, in which said acid is a water-soluble organic or inorganic acid.

* * * * *